Sept. 25, 1956
C. W. MYERS
2,764,004
VIBRATION DAMPENER
Filed Dec. 20, 1951
3 Sheets-Sheet 1
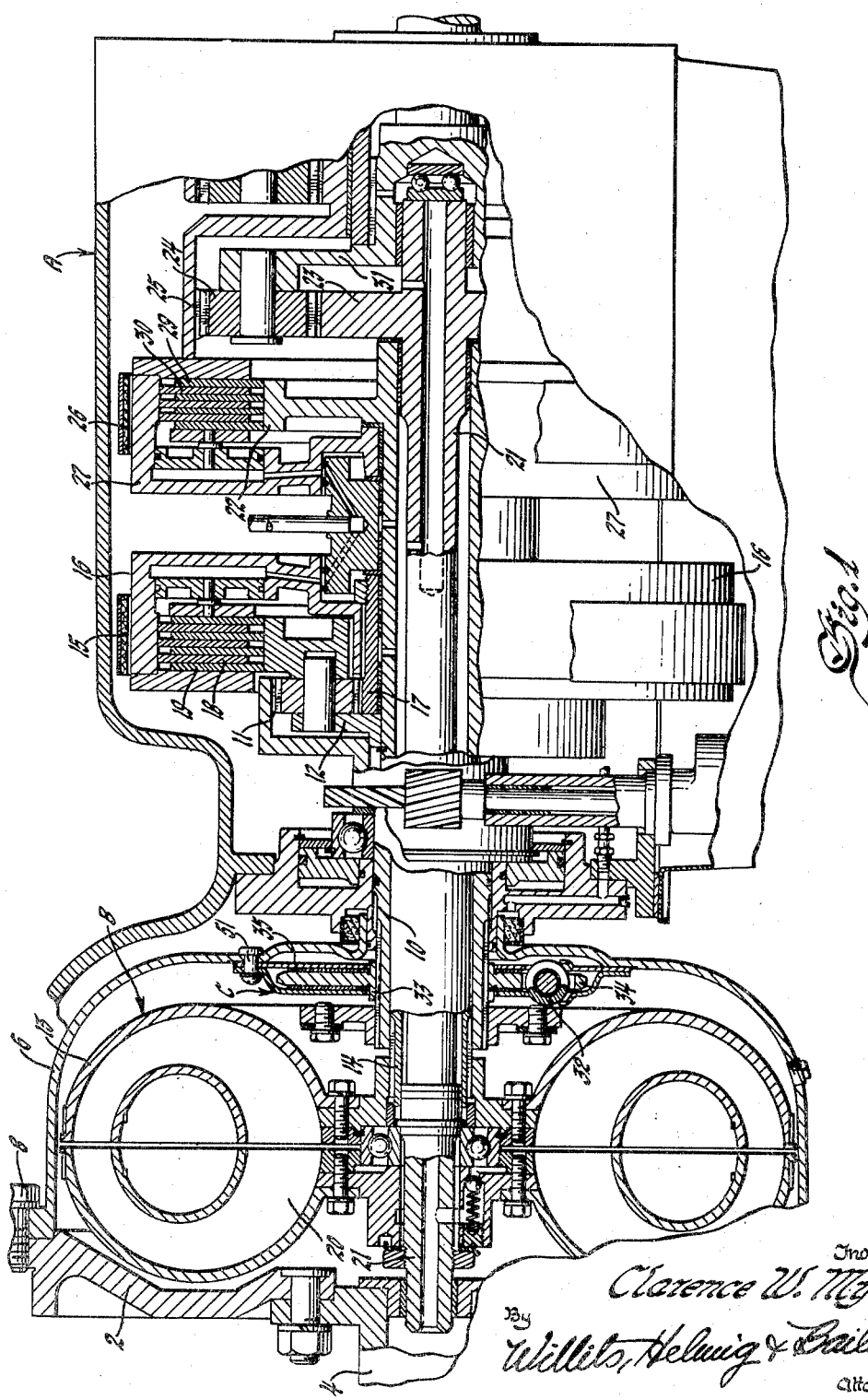

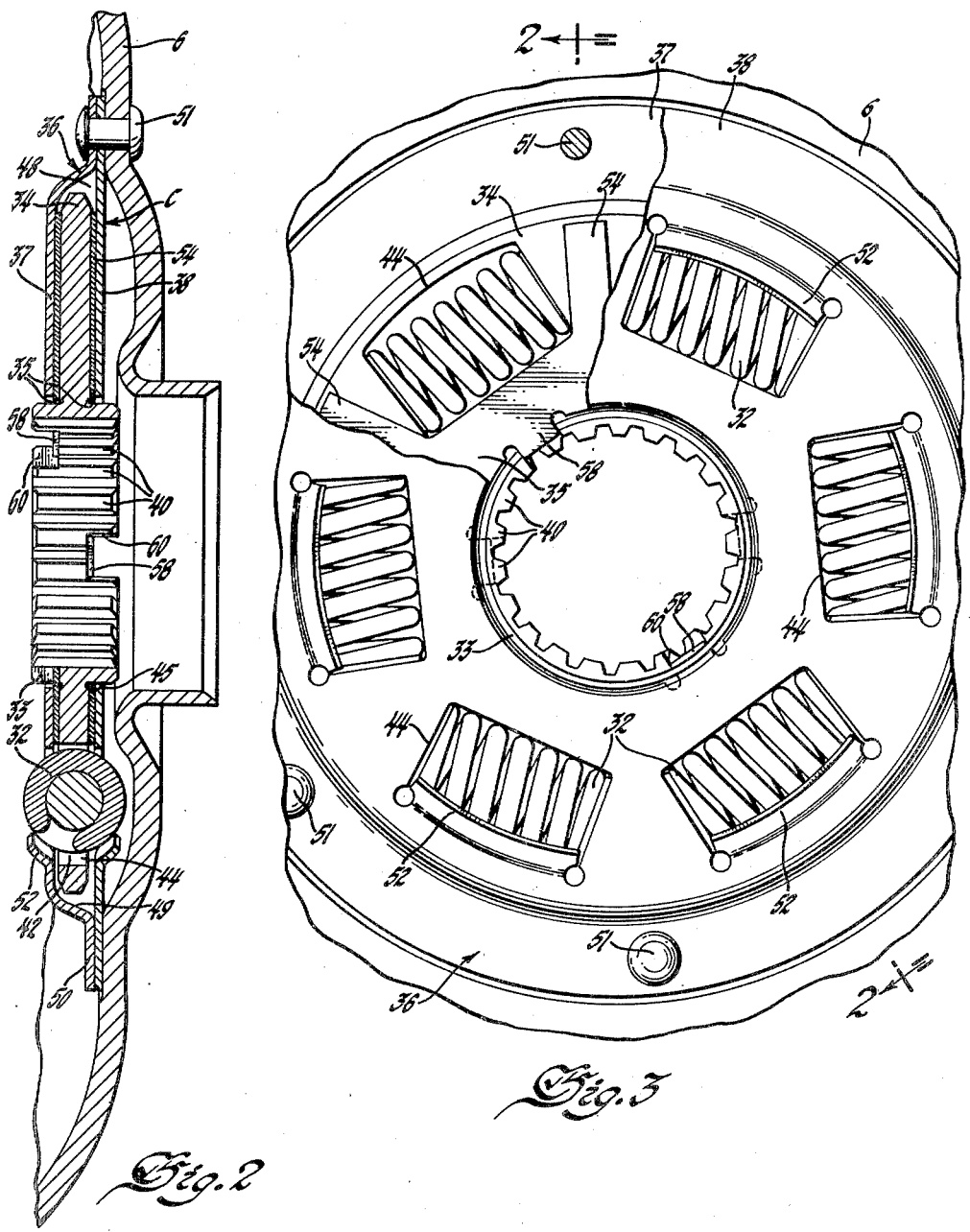

Sept. 25, 1956

C. W. MYERS 2,764,004

VIBRATION DAMPENER

Filed Dec. 20, 1951

Inventor
Clarence W. Myers
By Willis, Helwig & Baillio
Attorneys

United States Patent Office 2,764,004
Patented Sept. 25, 1956

2,764,004

VIBRATION DAMPENER

Clarence W. Myers, Pontiac, Mich., assignor to General Motors Corporation, Detroit, Mich., a corporation of Delaware Application December 20, 1951, Serial No. 262,572

9 Claims. (Cl. 64—27)

The present invention relates to torque transmitting couplings and more particularly it relates to shock absorbent dampeners for use in variable speed transmissions.

Whenever a rotary motion such as is produced by an internal combustion engine is transmitted by a revolving shaft which is rigidly connected to a load, there will be severe torsional impacts. Although these impacts generally take the form of sudden changes in angular velocity, and may be caused by a large variety of conditions, they most frequently result from rapidly changing loads. In order to minimize the harmful effects of these impacts on the motor and any associated drive shafts and gearing, it is necessary to use some sort of a shock absorbent coupling. There are a large assortment of devices to accomplish this objective. Among the more notable couplings are those which rely on resilient means such as springs to absorb any sudden changes in torque. Although these tend to dissipate the energy of an impact, when they are used a new problem is frequently created. At one or more critical engine speeds, the frequency of the vibrations will approach the resonant frequency of the springs. When this phenomenon occurs the springs will begin to oscillate. As the springs repeatedly expand and contract, there will be relative rotation between the driving and driven members of an oscillatory character. Such actions will cause a considerable amount of "whipping" or torsional vibrations in the driven shaft. These oscillations not infrequently reach such large proportions that they become more destructive and/or objectionable than the original impact being dampened.

It is therefore an object of the present invention to provide a resilient torque coupling which will absorb any sudden changes in angular velocity without simultaneously creating any further rotational vibrations.

It is a further object to provide a novel shock absorbent coupling which will eliminate any resonant vibrations thereof by frictionally over-dampening said coupling.

It is also an object to provide a shock absorbent coupling having a dampening action which is more easily adjusted and more effective than has heretofore been available.

It is also an object to provide in a rotating coupling a frictional dampener in which a frictional drag is created by a sliding contact between a plurality of elements wherein the contact extends to the outer periphery of the elements thereby causing the dampening action to take place at a considerable distance from the center of rotation.

A particular object of this invention is to provide an improved frictional dampener for a shock absorbing coupling including a plurality of star-shaped convex washers keyed to the dampener hub and having fingers or prongs adapted to exert pressure against the shrouding plates of the dampener assembly in order to place the friction load developed by the assembly at the greatest radial distance from the center line thereof in order to provide maximum friction capacity for a given size of vibration dampener.

These and other objects not specifically enumerated will become more apparent as the description of the present invention proceeds in connection with the accompanying drawings, wherein:

Fig. 1 is a side elevation in cross-section of an automatic transmission embodying the present invention.

Fig. 2 is a cross-sectional view of the shock absorbent dampener taken substantially along line 2—2 of Fig. 3.

Fig. 3 is a front elevation of the coupling partly broken away.

Figure 4:
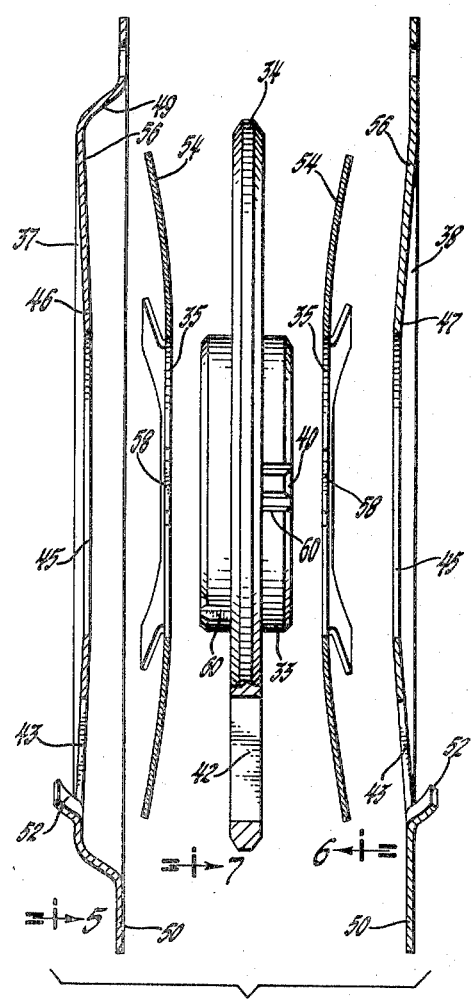
Fig. 4 is an exploded sectional view of the invention.

Referring to the drawings in more detail, A represents generally an automatic transmission suitable for installation in self-propelled vehicles. B is a conventional fluid flywheel, while C refers generally to a shock absorbent coupling embodying the present invention which is used to resiliently couple the engine and the transmission together. The engine flywheel 2, which is fastened to the motor drive shaft 4 is rigidly secured to the torus cover 6 by bolts 8 or any other suitable fastening means. The torus cover 6, by means of the novel shock absorber C, is resiliently coupled to a hollow power transmitting shaft 10.

Shaft 10 is operably connected to the ring gear 11 for driving the front planetary gear train. A planet carrier 12 drives a fluid coupling impeller 13 through sleeve 14 at a rotational speed less than engine speed whenever brake band 15 is applied to drum 16 to stop rotation of sun gear 17. Application of clutch plates 18, 19 locks sun gear 17 to carrier 12 so that the impeller 13 is driven at engine speed. Rotation of impeller 13 causes circulation of working fluid in the fluid coupling to drive the output member or turbine 20, which in turn drives central shaft 21.

Sleeve 14, in addition to driving impeller 13, extends to the right to drive clutch hub 22. Shaft 21, in turn drives sun gear 23 of the rear planetary gear train composed of sun gear 23, planet gears 24 and ring gear 25. A brake band 26 may be applied to stop rotation of drum 27 and ring gear 25 for reduction drive through the rear planetary unit. Clutch plates 29, 30 may be engaged to cause rotation of ring gear 25. With the clutch plates 29 and 30 engaged, drive to output carrier 31 is derived from rotation of both the sun gear 23 and ring gear 25. The control system for selectively actuating the brakes and clutches of the two planetary units may be similar to that shown in U. S. Letters Patent 2,377,696, issued June 5, 1945, to Oliver K. Kelly.

It will thus be seen that the torque from the engine rotates the flywheel 2 and the attached torus cover 6 which in turn, by means of the novel shock absorbent coupling C, fluid flywheel B, the selected gears of the front and rear planetary gear trains, rotates the output shaft 26. As the vehicle is accelerated or shifted from one gear ratio to another, the torque on the drive shaft 4 will be rapidly varied from one extreme to another, which in the absence of some sort of shock absorbent device, will cause severe stresses in said shaft and the associated gears. However, in the transmission of Fig. 1, the torque is resiliently transmitted from the torus or input member 6 to the sleeve or output member 10 by a plurality of springs 32 in the novel shock absorbent dampener so that the energy of any impact will be harmlessly dissipated.

As shown in detail in Figs. 2 and 3, the dampener or coupling C contains a substantially cylindrical hub 33, a flange 34 projecting radially outward therefrom, a plurality of friction plates or washers 35 secured to the hub and in substantially parallel relationship to the flange 34, and a shroud or housing 36 formed by a pair of spring retaining plates 37—38 that are secured to the torus cover 6 and encase the flange 34 and washers 35.

Figure 7:
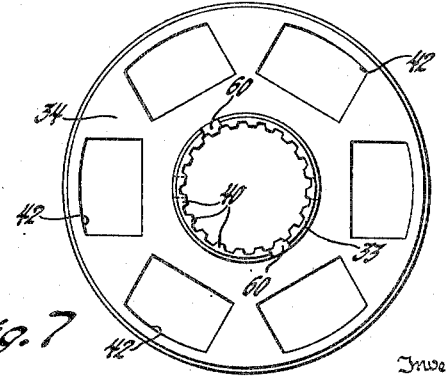
Fig. 7 is an elevation of the shock absorber taken substantially along line 7 of Fig. 4.

The hub 33 which is a substantially cylindrical drum, has a plurality of splines 40 or any other suitable keying mechanism on its interior for locking it onto a rotating drive shaft 10. On the exterior of the hub there is a circular flange 34 which in the present instance is made integral with the hub and extends radially outward. There are a plurality of circumferentially spaced openings or windows 42 through said flange 34 the shape of which can be clearly seen in Fig. 7. These openings in combination with the substantially similar openings 43 in each of the retaining plates 37—38 form pockets 44 for receiving springs 32. However, this will be more fully described in connection with the shroud or cover 36.

Figure 5:
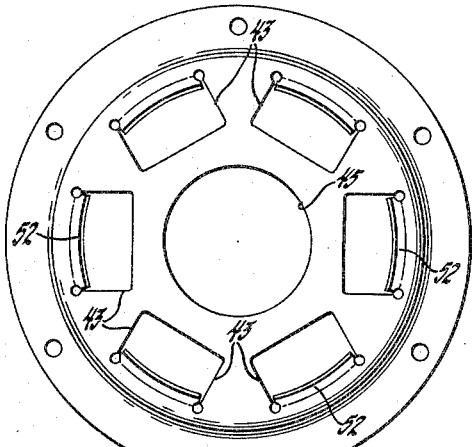
Fig. 5 is an elevation of the dampener taken substantially along line 5 of Fig. 4.

The shroud or cover 36 is formed by two plates, the front spring retaining plate 37, and the rear spring retaining plate 38 shown in detail in Figs. 4 and 5. Both of these plates have a central opening 45 of slightly larger diameter than that of the external diameter of the hub 33. Thus, when the shroud 36 is assembled and in place, the hub may rotate without any direct interference from said shroud. Both the front and the rear plates 37 and 38 are conically tapered inwardly slightly in their central portion as indicated at 46 and 47 in Fig. 4. The retaining plates 37 and 38 are spaced to form a chamber 48 large enough to tightly encase the flange 34 and friction washers 35 when fully assembled. In the embodiment shown, the front plate 37 only is offset at 49 adjacent the outer periphery 56 of chamber 48.

The dished portions 46 and 47 shown in Fig. 4 of the front and rear cover plates present axially extending surfaces adapted for resilient axial motion and normally pre-stressed axially to frictionally engage the star shaped washers hereafter described in detail. More specifically, the dished surfaces 46 and 47 of the front and rear cover members act as pre-stressed springs acting in an axial direction to grip the friction washers when the parts are all assembled. The forming of these members in such a deflected manner creates a spring action which, as will be seen, greatly increases the dampening capacity of the coupling to any predetermined amount.

Figure 6:
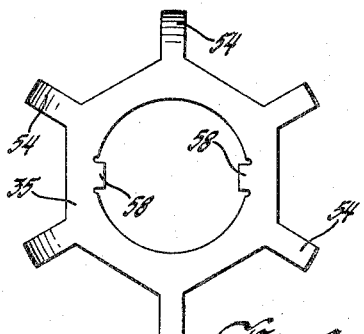
Fig. 6 is an elevation of the shock absorber taken substantially along line 6 of Fig. 4.

The outer shoulder 50 of each plate 37—38 is secured to the torus cover 6 by bolts or rivets 51 or by any other suitable means. In addition, as previously noted, each plate has a series of similarly shaped windows 43 therethrough, six in the present embodiment, which are circumferentially spaced at uniform intervals around the plate. These openings or windows 43 line up with the openings or windows 42 in the flange 34 to form pockets 44 to retain the springs 32 which seat on the opposite ends of the windows. These springs 32 are prevented from falling from the pockets 44 by the retaining lugs 52 which are struck outwardly from the outer edge of the openings 43. Coiled springs have been found to be the most satisfactory for this type of coupling and they should preferably be of such length that they will extend the full length of the windows to engage both ends of the pocket when the coupling is at rest. As will be seen particularly in Figs. 4 and 6, both friction washers 35 are preformed to be dished shape in natural configuration so as to apply axial thrust to the housing members 37 and 38 in assembled relation.

As torque is applied to one member, say the shroud 36, it will rotate and compress the springs until their tension is sufficient to balance the applied torque. When such an equilibrium is established, the driven hub 33 will commence rotating at the same speed as the driving member. Should any sudden fluctuations in the rotational velocity occur, the springs 32 will prevent any jarring impact by resiliently absorbing the forces created by these changes. To prevent any vibratory oscillations, the improved friction washers 35 are disposed between the flange 34 and the spring retaining plates 37, 38 to frictionally oppose any relative motion between the driven and driving members. Since the springs are located in the pockets 44 formed in the flange 34 and cover plates 37 and 38, the washers 35 cannot be a complete disc. Therefore the friction washers are basically a ring having a plurality of fingers or arms 54 that project radially out from the center of the washer to give it the star or spider shape of Fig. 6. It will be noted that the springs 32 seat upon the opposite ends of the windows provided in the flange 34 and members 37 and 38 and also contact the base of fingers 54 provided upon the two friction washers 35.

However, as previously stated, since the location of the springs 32 is such that a complete disc cannot be employed to achieve this end the arms 54 extend between the springs and radially outwardly beyond springs 32. Thus the frictional drag will be created between the outer extremities of the arms 54 and the periphery 56 of the inner surface of the housing 36.

A multiplicity of lugs 58 extend inwardly from the washer 35 to engage corresponding grooves 60 on the outer periphery 56 of the hub 33. Thus, the washers 35 are non-rotatably mounted on the hub so that any force acting on the arms 54 of the washer 35 will directly influence the motion of the hub. When the coupling is fully assembled, the bow of the arms 54 will oppose the original inwardly deflected shape of the retaining plates 37, 38 resulting in the said members assuming substantially a plane or straight shape, whereby a relatively greater degree of axial thrust is exerted between the assembled members. Although both of these members can be straight originally since the curved structure creates a greater pressure between the elements it results in greatly increasing the frictional drag. Moreover, it will insure the frictional contact extending to the very ends of the arms and the periphery of the cover where it is most effective in dampening any possible oscillatory motions. Since frictional drag will be proportional to the pressure between the sliding members, it is a simple matter to vary said drag by varying the original deflections of the plates 37, 38 and the arms 54 of washers 35. It can therefore be seen that by conically preforming the arms and plates a frictional drag of any predetermined amount can be created.

In operation, as previously described, the springs will be compressed as the flange 34 and the cover 36 rotate relative to each other until both members are rotating together in unison. In case they is any tendency for the springs to start oscillating due to a resonant condition, the fingers 54 of the friction washers will have to slide across the surface of the cover which will create a frictional drag opposing such a motion. This drag should be large enough to overdampen the system. In other words, the energy required to move these parts relative to each other will be so large that the springs will be unable to oscillate.

It will be apparent from the foregoing description that the fingers 54 extend radially outwardly beyond the springs 32 into close proximity with the exterior periphery 56 of chamber 48 to provide for maximum friction gripping between the friction washers and the outer and inner shroud members 37 and 38. This fixture is of particular importance in assemblies of the present type wherein the size of the dampener is dictated by crowded space limitations. By constructing the friction dampener as described, more efficient dampening of resonant oscillations is accomplished without increasing the overall space required for the dampener assembly. By proper heat treatment of the friction washers and outer and inner housing members the axial spring effect of these members and the friction dampening effect thereof may be altered to achieve the proper dampening effect for any particular installation in which the assembly is to be used.

It will be apparent to anyone skilled in the art that the present invention may be embodied in numerous other specific forms than that described without departing from the true spirit or essential attributes thereof. While the coupling has been shown on an automatic transmission, it may be employed wherever a resilient coupling is required. It is therefore desired that the present embodiment be considered in all respects illustrative and in no way restrictive, reference being had to the appended claims rather than to the foregoing description to indicate the scope of the invention.

I claim:

1. In a shock absorber dampener, the combination of a substantially cylindrical hub, a flange on said hub, a pair of plates locked together in substantially coaxial relationship with said hub and disposed on opposite sides of said flange, a plurality of spring retaining pockets comprising a multiplicity of registering windows through said plates and flange, a spring in each of said pockets, and a set of friction elements on said hub, said friction elements being positioned on opposite sides of said flange to frictionally engage said flange and said plates, said plates being positioned to compress said friction elements against said flange and said plates for frictional engagement therewith, said friction elements projecting radially outward from said hub beyond said springs to frictionally engage said plates radially exteriorly of said springs.

2. In a power transmitting means, a driving member, a driven member, a substantially cylindrical hub rigidly secured to one of said members, a flange projecting radially outward from said hub, and having a multiplicity of windows therethrough, a pair of plates attached to the other of said members encompassing said flange and having a multiplicity of windows therein to cooperate with said first mentioned windows, spring means in said windows to resiliently couple said flange and plates together, and a plurality of radial arms on said hub extending outwardly along said flange, said arms being resiliently biased between said flange and said plates to frictionally engage said plates radially exteriorly of said spring means.

3. In a power transmitting means, a driving member, a driven member, a substantially cylindrical hub rigidly secured to said driven member, a flange projecting radially outward from said hub and having a multiplicity of substantially rectangular windows therethrough, a pair of plates attached to said driving member forming a chamber for receiving said flange and having a multiplicity of windows therein to cooperate with said first mentioned windows, spring means in said windows to resiliently couple said flange and plates together, and a plurality of radial arms on said hub extending outwardly along said flange, said arms being resiliently biased between said flange and said plates to frictionally engage said plates adjacent the point of attachment of said plates to said driving member.

4. In a vibration dampening device the combination of a driving member, a driven hub member, a radial flange on said hub member, a pair of retaining plates rigidly fixed to said driving member, a plurality of spring retaining pocket means said means comprising registering apertures spaced circumferentially in said flange and retaining plates, and overhanging lugs formed in said plates externally of said apertures, a coiled spring disposed in each of said pocket means and retained in said apertures by said lugs, a pair of friction washers axially spaced on each side of said hub and keyed to rotate therewith, and a plurality of arms on said washers extending radially outward between said flange and said retaining plates, said arms which are normally curved in their unstressed shape being distorted into a substantially planular shape against said plates to exert a resilient friction loading force of predetermined magnitude against the outer periphery of said retaining plates to thereby absorb any rotational vibrations in said driving and driven members.

5. In a device of the class described, the combination of a driving member, a driven member, shroud means secured to said driving member said shroud means including a pair of retaining plates shaped to form a chamber therebetween, a hub member secured to said driven member, a radial flange on said hub extending into said chamber, a plurality of pockets formed by registering windows in said flange and plates, springs disposed in each of said pockets, spring retaining means positioned to retain said springs in said pockets, a pair of friction washers secured to said hub on opposite sides of said flange, and a plurality of fingers on said washer positioned adjacent said flange and frictionally engaging said retaining plates radially outwardly past said springs.

6. A vibration dampener assembly for transferring torque from a driving member to a driven member, comprising, a pair of retaining plates rigidly secured to said driving member, said plates when unstressed being dished, a chamber formed between said plates, a hub rigidly secured to said driven member, a radial flange on said hub extending into said chamber, a pair of friction washers secured to said hub and axially disposed on each side of said flange, a plurality of spring retaining pockets in said plates and flange, a plurality of prestressed coil springs disposed in said pockets so as to resiliently bear against the ends thereof, lug means on said plates to retain said springs in said pockets, and a multiplicity of curved fingers on said washers, said fingers when unstressed being curved, said fingers extending radially outwardly between the ends of said pockets and being compressed into a substantially planular shape against said retaining plates and frictionally engaging said retaining plates radially exteriorly of said springs.

7. A frictional dampener assembly for transmitting torque from a driving member to a driven member comprising, a pair of shroud members carried by said driving member, said shroud members enclosing a chamber therebetween, a hub member carried by said driven member and including a flange extending radially outwardly into said chamber, a pair of friction washers carried by said hub member, said washer when unstressed being dished, said washers being compressed between said shroud members and said flange on opposite sides of said flange to distort said friction washers into a substantially planular shape, a plurality of windows in said hub flange and said shroud member for receiving coil springs, a coil spring disposed in each of said windows, a plurality of fingers on said friction washers extending radially outwardly from the base portion of said friction washers, each of said coil springs being in contact with said friction washers at the base of said fingers, and said fingers extending radially outwardly between said springs for frictional engagement with said shroud members.

8. In a device of the class described, the combination of a driving member, a substantially cylindrical hub member, a radial flange on said hub member, a set of friction washers keyed to rotate with said hub and axially disposed on each side of said flange, a plurality of fingers on said washers extending radially outward, a pair of substantially parallel retaining plates rigidly secured to said driving member and being spaced to compress said washers and said flange therebetween to thereby frictionally engage said fingers, a group of spring retaining pockets formed by registering windows in said flange and plates circumferentially disposed between said fingers, and a coil spring in each of said pockets.

9. In a vibration dampener assembly for transmitting torque from a driving member to a driven member, the combination of a substantially cylindrical hub member on said driven member, a flange projecting radially outwardly from said hub, a pair of friction elements keyed to rotate with said hub and axially disposed on each side of said flange, said elements comprising washers having a plurality of radial fingers which when unstressed are normally arcuate, a pair of retaining plates rigidly secured to said driving member and encasing said friction elements and flanges, said plates when unstressed being normally dished, said fingers and said plates being compressed against each other to distort said fingers and said plates into a substantially planular shape to create a frictional force between said plates and fingers of predetermined magnitude, a plurality of spring retaining pockets formed by substantially rectangular registering windows in said flange and plates circumferentially disposed between the fingers of said friction member, and a coil spring seated in each of said pockets.

References Cited in the file of this patent
UNITED STATES PATENTS

| | | |
|---|---|---|
| 2,314,948 | Nutt | Mar. 30, 1943 |
| 2,340,186 | Harden | Jan. 25, 1944 |
| 2,574,573 | Libby | Nov. 13, 1951 |
| 2,623,409 | Herndon | Dec. 30, 1952 |